United States Patent
Xiong et al.

(10) Patent No.: US 10,632,609 B2
(45) Date of Patent: Apr. 28, 2020

(54) LINKAGE MECHANISM AND ROBOT HAVING THE SAME

(71) Applicant: UBTECH Robotics Corp, Shenzhen (CN)

(72) Inventors: Youjun Xiong, Shenzhen (CN); Xiaopeng Wu, Shenzhen (CN); Lefeng Liu, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 174 days.

(21) Appl. No.: 15/856,152

(22) Filed: Dec. 28, 2017

(65) Prior Publication Data

US 2019/0160656 A1 May 30, 2019

(30) Foreign Application Priority Data

Nov. 30, 2017 (CN) .......................... 2017 1 1244441

(51) Int. Cl.
| | |
|---|---|
| B25J 9/00 | (2006.01) |
| B25J 9/10 | (2006.01) |
| B25J 15/00 | (2006.01) |
| B25J 17/02 | (2006.01) |
| B25J 18/00 | (2006.01) |
| B25J 9/12 | (2006.01) |
| B25J 9/02 | (2006.01) |

(52) U.S. Cl.
CPC .............. *B25J 9/0006* (2013.01); *B25J 9/02* (2013.01); *B25J 9/10* (2013.01); *B25J 9/106* (2013.01); *B25J 9/12* (2013.01); *B25J 9/126* (2013.01); *B25J 15/0009* (2013.01); *B25J 17/0258* (2013.01); *B25J 17/0266* (2013.01); *B25J 18/00* (2013.01); *B25J 18/005* (2013.01); *Y10S 901/19* (2013.01)

(58) Field of Classification Search
CPC ... B25J 9/0006; B25J 9/10; B25J 9/106; B25J 9/12; B25J 9/126; B25J 15/0009; B25J 18/00; B25J 18/005; B25J 9/1065; B25J 9/107; B25J 17/0266
USPC ........ 74/490.03, 490.05, 490.06; 901/15, 19, 901/23, 28
See application file for complete search history.

(56) References Cited

U.S. PATENT DOCUMENTS

| | | | | |
|---|---|---|---|---|
| 4,095,481 A | * | 6/1978 | Kasai ......................... | B25J 9/04 414/917 |
| 4,252,360 A | * | 2/1981 | Gallaher, Jr. .......... | B25J 9/0084 294/106 |
| 4,780,047 A | * | 10/1988 | Holt .......................... | B25J 3/04 414/730 |
| 5,423,648 A | * | 6/1995 | Akeel .................... | B21D 43/05 198/468.2 |

(Continued)

FOREIGN PATENT DOCUMENTS

| | | | | |
|---|---|---|---|---|
| WO | WO-2008031023 A2 | * | 3/2008 | ............ G06F 3/016 |

*Primary Examiner* — Victor L MacArthur
*Assistant Examiner* — Joseph Brown

(57) ABSTRACT

A linkage mechanism includes a chest assembly of a robot; a servo arranged within the chest assembly and comprising an output shaft; a first linkage member including a first end and a second opposite end, the first end being connected to the output shaft; a forearm assembly rotatably connected to the second end of the first linkage member; and a second linkage member. Opposite ends of the second linkage member are rotatably connected to the chest assembly and the forearm assembly.

15 Claims, 1 Drawing Sheet

(56) References Cited

U.S. PATENT DOCUMENTS

| | | | | |
|---|---|---|---|---|
| 5,743,149 | A * | 4/1998 | Cullity | B66F 11/046 74/490.05 |
| 5,800,423 | A * | 9/1998 | Jensen | B25J 9/1065 606/1 |
| 6,286,387 | B1 * | 9/2001 | Adachi | G06F 3/0346 74/490.03 |
| 6,301,526 | B1 * | 10/2001 | Kim | B25J 9/0006 600/1 |
| 6,428,267 | B1 * | 8/2002 | Terpstra | B23Q 1/56 212/319 |
| 7,752,939 | B2 * | 7/2010 | Ono | B25J 9/042 74/490.03 |
| 8,272,290 | B2 * | 9/2012 | Zhang | B25J 9/107 74/490.01 |
| 2008/0314181 | A1 * | 12/2008 | Schena | A61B 34/70 74/469 |
| 2011/0126660 | A1 * | 6/2011 | Lauzier | B25J 17/0208 74/490.05 |
| 2012/0240710 | A1 * | 9/2012 | Yokoyama | B25J 9/1065 74/490.05 |
| 2014/0060231 | A1 * | 3/2014 | Watanabe | B25J 19/0054 74/490.03 |
| 2014/0142752 | A1 * | 5/2014 | Nogami | B25J 9/12 700/245 |
| 2014/0238177 | A1 * | 8/2014 | Nagatsuka | B25J 17/0266 74/490.06 |
| 2015/0202780 | A1 * | 7/2015 | Wang | A61B 34/30 74/490.05 |
| 2016/0114479 | A1 * | 4/2016 | Rosheim | B25J 9/0075 74/490.03 |
| 2016/0284968 | A1 * | 9/2016 | Miyazawa | H02N 2/0015 |
| 2016/0365771 | A1 * | 12/2016 | Kokubo | H02P 6/16 |

* cited by examiner

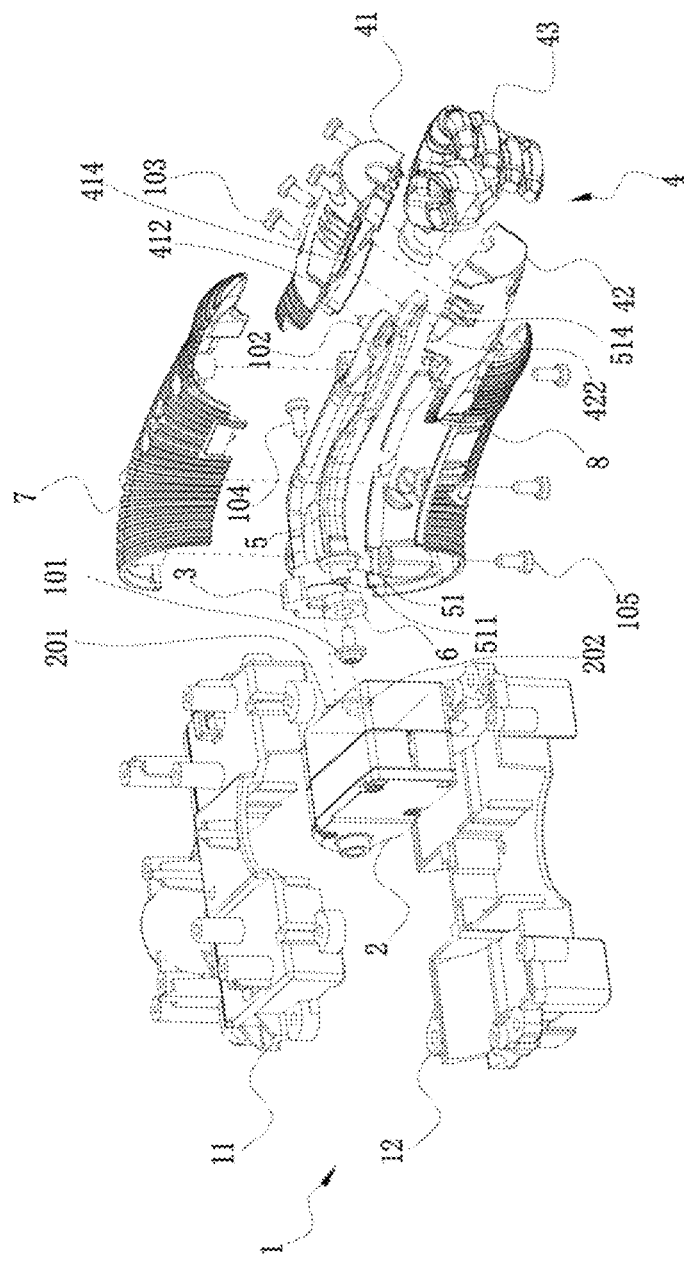

LINKAGE MECHANISM AND ROBOT HAVING THE SAME

CROSS REFERENCE TO RELATED APPLICATIONS

This application claims priority to Chinese Patent Application No. CN201711244441.6, filed Nov. 30, 2017, which is hereby incorporated by reference herein as if set forth in its entirety.

BACKGROUND

1. Technical Field

The present disclosure generally relates to robots, and particularly to a linkage mechanism and a robot.

2. Description of Related Art

For an arm of some humanoid robots, the shoulder joint and the elbow joint require two servos, thereby achieving two degrees of freedom. However, it is not cost effective to use such two servos in the arm.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

The drawing is an isometric exploded view of a linkage mechanism according to one embodiment.

DETAILED DESCRIPTION

The disclosure is illustrated by way of example and not by way of limitation in the FIGURES of the accompanying drawings, in which like reference numerals indicate similar elements. It should be noted that references to "an" or "one" embodiment in this disclosure are not necessarily to the same embodiment, and such references can mean "at least one" embodiment.

In the description, relative terms such as "upper," "lower," "up," "down," "top" and "bottom" as well as derivatives should be construed to refer to the orientation as then described or as shown in the drawing under discussion.

Referring to drawing, in one embodiment, a linkage mechanism includes a chest assembly 1, a servo 2, a first linkage member 3, a forearm assembly 4 and a second linkage member 5. The chest assembly 1 is an upper portion of a robot. The servo 2 is secured within the chest assembly 1 and includes an output shaft 201. The first linkage member 3 includes a first end and a second opposite end, and the first end is coaxial with and fixed to the output shaft 201 and is thus rotatabale together with the output shaft 201. The second end of the first linkage member 3 is rotatably connected to the forearm assembly 4. Two opposite ends of the second linkage member 5 are rotatably connected to the chest assembly 1 and the forearm assembly 4. It should be noted that the servo 2 can be any conventional servo and thus will not be described in detail herein. In addition, the first linkage member 3 and the second linkage member 5 are substantially parallel to each other.

With such configuration, the chest assembly 1, the first linkage member 3, the forearm assembly 4 and the second linkage member 5 form a spatial linkage mechanism. When the output shaft 201 of the servo 2 rotates, the first linkage member 3 rotates together with the output shaft 201. The end of the first linkage member 3 that is away from the output shaft 201 drags the forearm assembly 4 to move. The second linkage member 5 is then driven to rotate by the forearm assembly 4. During the rotation of the first linkage member 3 and the second linkage member 5, the forearm assembly 4 moves together with them while changing its orientation. The first linkage member 3 and the second linkage member 5 that constitute an arm of the robot can rotate as a whole, and the forearm assembly 4 can rotate with respect to the "upper arm" constituted by the first linkage member 3 and the second linkage member 5. Thus, two degrees of freedom of one arm of a robot can be achieved by using one servo and the spatial linkage mechanism, which is cost effective and easy to assemble.

In one embodiment, the first end of the first linkage member 3 is fixed to the output shaft 201 of the servo 2 via a fourth fastener 104. Specifically, the first end defines a through hole and one end of the fourth fastener 104 passes through the through hole and is fixed to the output shaft 201. In one embodiment, the fourth fastener 104 is a screw.

In one embodiment, the chest assembly 1 includes a first frame 11 and second frame 12. The first frame 11 and the second frame 12 are located at an upper portion of the torso of the robot and arranged opposite to each other. The servo 2 is fixed through the first frame 11 and the second frame 12. The end of the second linkage member 5 that is away from the forearm assembly 4 is rotatably connected to the first frame 11 and the second frame 12. Specifically, the servo 2 is fixedly sandwiched between the first frame 11 and the second frame 12. The end of the second linkage member 5 that is away from the forearm assembly 4 is rotatably held with the first frame 11 and the second frame 12.

In one embodiment, the linkage mechanism further includes a bearing 6 that enables the second linkage member 5 to rotate with respect to the first frame 11 and the second frame 12. The bearing 6 is held in position between the first frame 11 and the second frame 12. The bearing 6 is axially fixed to the second linkage member 5 by a first fastener 101 to prevent the second linkage member 5 from disengaging from the bearing 6. The end of the second linkage member 5 that is away from the forearm assembly 4 includes an axle 51. In the embodiment, the axle 51 is cylindrical. The bearing 6 is arranged around the axle 51. One end of the axle 51 defines a receiving hole 511. One end of the first fastener 101 is received in the receiving hole 511 and the other end has a head abutting against an end surface of the bearing 6. The head is securely fit in a bore 202 defined in the side surface of the servo 2 where the output shaft 201 protrudes. In the embodiment, the bearing 6 is a flange bearing. The first fastener 101 can be a flat-panel self-tapping screw. One end of the first fastener 101 is inserted into the receiving hole 511 in an interference fit manner.

In the embodiment, the forearm assembly 4 includes a first housing 41, a second housing 42 fixed to the first housing 41 and a hand 43 connected to the first housing 41 and the second housing 42. One end of the hand 43 is held between the first housing 41 and the second housing 42. Specifically, the first housing 41 and the second 42 are connected to each other via a number of third fasteners 103. In one embodiment, the fasteners 103 are self-tapping screws. In the embodiment, the number of the fasteners 103 is four and the four fasteners 103 are evenly distributed. It should be noted that the number of the fasteners 103 can vary according to need.

The second end of the first linkage member 3 that is away from the servo 2 is rotatably connected to the first housing 41. The end 514 of the second linkage member 5 that is away from the chest assembly 1 is rotatably connected to the second housing 42. Specifically, the first housing 41 includes a first protruding post 412 on an inner surface thereof, and the second housing 42 includes a second protruding post 422 on an inner surface thereof. The first linkage member 3 is rotatably connected to the first protruding post via a second fastener 102. The end 514 of the second linkage member 5 defines a through hole that allows it to be rotatably arranged around the second protruding post 422. In the embodiment, the first housing 41 includes a third protruding post 414 defines a receiving hole for receiving an end of the second protruding post 422. A third fastener 103 passes through a through hole in the third protruding post 414 and is securely fit in a bore in the second protruding post 422. With such configuration, the third protruding post 414 can prevent the movement of the end 514 of the second linkage member 5 along the second protruding post 422. The second linkage member 5 is thus rotatably connected to the second housing 42. In one embodiment, the first protruding post is located at the end that is adjacent to the first linkage member 3, and the second protruding post is located at the end that is adjacent to the second linkage member 5.

In one embodiment, the first protruding post 412 defines a mounting hole. One end of the second fastener 102 passes through a through hole in the second end of the first linkage member 3 and is received in the mounting hole, thus preventing the first linkage member from disengaging from the first protruding post and allowing the first housing 41 to rotate with respect to the second end of the first linkage member 3. In the embodiment, the second fastener 102 is a flat-panel self-tapping screw. One end of the second fastener 102 is inserted into the mounting hole in an interference fit manner.

In one embodiment, the linkage mechanism further comprising a first arm housing 7 and a second arm housing 8 that are connected to the first linkage member 3. The first arm housing 7 and the second arm housing 8 corporately define a receiving space to receive the first and second linkage members 3 and 5. Specifically, the first arm housing 7 and the second arm housing 8 are fixedly connected to the first linkage member 3 by a number of fifth fasteners 105. In one embodiment, the fifth fastener 105 is a self-tapping screw. In the embodiment, the number of the fifth fasteners 105 is three, and the fifth fasteners 105 are evenly distributed. It should be noted that the number of the fifth fasteners 105 may vary according to actual needs.

In summary, one end of the first linkage member 3 is fixed to the output shaft 201 of the servo 2, and the other end is rotatably connected to the first housing 41 of the forearm assembly 4. The servo 2 is held in position by the first frame 11 and the second frame 12 of the chest assembly. One end of the second linkage member 5 is held between the first frame 11 and the second frame 12, and the other end is rotatably connected to the second housing 42. The first housing 41 and the second housing 42 are fixed to each other via screws. A spatial linkage mechanism is thus formed. With such configuration, when the output shaft 201 of the servo 2 rotates, the first linkage member 3 rotates together with the output shaft 201. The end of the first linkage member 3 that is away from the output shaft 201 rotates with respect to the shank of the second fastener 102. The bearing 6 enables the second linkage member 5 to rotate together with them. During the rotation of the first linkage member 3 and the second linkage member 5, the forearm assembly 4 moves together with them while changing its orientation. The first linkage member 3 and the second linkage member 5 that constitute an arm of the robot can rotate as a whole, and the forearm assembly 4 can rotate with respect to the "upper arm" constituted by the first linkage member 3 and the second linkage member 5.

The present disclosure also provides a robot including the linkage mechanism of the above embodiments, which is cost effective and easy to assemble.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A linkage mechanism comprising:
a chest assembly of a robot;
a servo arranged within the chest assembly and comprising an output shaft;
a first linkage member comprising a first end and a second opposite end, the first end being connected to and rotatable together with the output shaft;
a forearm assembly rotatably connected to the second end of the first linkage member; and
a second linkage member, opposite ends of the second linkage member being rotatably connected to the chest assembly and the forearm assembly;
wherein the forearm assembly comprises a first housing, a second housing fixed to the first housing and a hand connected to the first housing and the second housing, the second end of the first linkage member is rotatably connected to the first housing, and an end of the second linkage member that is away from the chest assembly is rotatably connected to the second housing, and
wherein the first housing comprises a first protruding post on an inner surface thereof, the second housing comprises a second protruding post on an inner surface thereof, the first linkage member is rotatably connected to the first protruding post via a first fastener, and the second linkage member is rotatably arranged around the second protruding post.

2. The linkage mechanism according to claim 1, wherein the chest assembly comprises a first frame and a second frame, the servo is fixed through the first frame and the second frame, an end of the second linkage member that is away from the forearm assembly is rotatably connected to the first frame and the second frame.

3. The linkage mechanism according to claim 2, further comprising a bearing, wherein the bearing is arranged around the end of the second linkage member that is away from the forearm assembly, and axially fixed by a second fastener.

4. The linkage mechanism according to claim 3, wherein the end of the second linkage member that is away from the forearm assembly includes an axle, the bearing is arranged around the axle, one end of the axle defines a receiving hole, the second fastener is received in the receiving hole and comprises a head abutting against an end surface of the bearing.

5. The linkage mechanism according to claim 1, wherein the first protruding post defines a mounting hole, one end of the first fastener passes through the first linkage member and is received in the mounting hole.

6. The linkage mechanism according to claim 1, wherein the first housing and the second housing are fixed to each other by a third fastener.

7. The linkage mechanism according to claim 1, further comprising a first arm housing and a second arm housing that are connected to the first linkage member.

8. A robot comprising a linkage mechanism, the linkage mechanism comprising:
   a chest assembly of the robot;
   a servo arranged within the chest assembly and comprising an output shaft;
   a first linkage member comprising a first end and a second opposite end, the first end being connected to the output shaft;
   a forearm assembly rotatably connected to the second end of the first linkage member; and
   a second linkage member, opposite ends of the second linkage member being rotatably connected to the chest assembly and the forearm assembly;
   wherein the forearm assembly comprises a first housing, a second housing fixed to the first housing and a hand connected to the first housing and the second housing, the second end of the first linkage member is rotatably connected to the first housing, and an end of the second linkage member that is away from the chest assembly is rotatably connected to the second housing, and
   wherein the first housing comprises a first protruding post on an inner surface thereof, the second housing comprises a second protruding post on an inner surface thereof, the first linkage member is rotatably connected to the first protruding post via a first fastener, and the second linkage member is rotatably arranged around the second protruding post.

9. A linkage mechanism comprising:
   a chest assembly of a robot;
   a servo arranged within the chest assembly and comprising an output shaft;
   a first linkage member comprising a first end and a second opposite end, the first end being connected to and rotatable together with the output shaft with respect to the chest assembly about a first axis;
   a forearm assembly to which the second end of the first linkage member is hinged in such a way that the first linkage member is rotatable with respect to the forearm assembly about a second axis, the second axis being obliquely oriented relative to the first axis;
   a second linkage member, opposite ends of the second linkage member being rotatably connected to the chest assembly and the forearm assembly, wherein the chest assembly, the first linkage member, the forearm assembly and the second linkage member form a four-bar linkage; and
   a bearing arranged around an end of the second linkage member that is away from the forearm assembly, and axially fixed by a first fastener;
   wherein the chest assembly comprises a first frame and a second frame, the servo is fixed through the first frame and the second frame, the end of the second linkage member that is away from the forearm assembly is rotatably connected to the first frame and the second frame and includes an axle around which the bearing is arranged, one end of the axle defines a receiving hole, the first fastener is received in the receiving hole and comprises a head abutting against an end surface of the bearing.

10. The linkage mechanism according to claim 9, wherein the forearm assembly comprises a first protruding post extending along the second axis and defining a mounting hole, a second fastener passing through a through hole in the second end of the first linkage member and being received in the mounting hole.

11. The linkage mechanism according to claim 9, wherein the forearm assembly comprises a first housing, a second housing fixed to the first housing and a hand connected to the first housing and the second housing, the second end of the first linkage member is rotatably connected to the first housing, and an end of the second linkage member that is away from the chest assembly is rotatably connected to the second housing.

12. The linkage mechanism according to claim 11, wherein the first housing comprises a first protruding post on an inner surface thereof, the second housing comprises a second protruding post on an inner surface thereof, the first linkage member is rotatably connected to the first protruding post via a second fastener, and the second linkage member is rotatably arranged around the second protruding post.

13. The linkage mechanism according to claim 12, wherein the first protruding post defines a mounting hole, one end of the second fastener passes through the first linkage member and is received in the mounting hole.

14. The linkage mechanism according to claim 12, further comprising a first arm housing and a second arm housing that are connected to the first linkage member.

15. The linkage mechanism according to claim 11, wherein the first housing and the second housing are fixed to each other by a third fastener.

* * * * *